US012655912B2

(12) United States Patent
Bergström et al.

(10) Patent No.: US 12,655,912 B2
(45) Date of Patent: Jun. 16, 2026

(54) VALVE AND METHOD FOR MANUFACTURING A CLOSURE MEMBER

(71) Applicant: VALMET FLOW CONTROL OY, Vantaa (FI)

(72) Inventors: Tommi Bergström, Vantaa (FI); Pietari Skott, Vantaa (FI); Petri Viinikainen, Vantaa (FI)

(73) Assignee: VALMET FLOW CONTROL OY, Vantaa (FI)

( * ) Notice: Subject to any disclaimer, the term of this patent is extended or adjusted under 35 U.S.C. 154(b) by 0 days.

(21) Appl. No.: 18/722,856

(22) PCT Filed: Dec. 22, 2021

(86) PCT No.: PCT/FI2021/050910
§ 371 (c)(1),
(2) Date: Jun. 21, 2024

(87) PCT Pub. No.: WO2023/118641
PCT Pub. Date: Jun. 29, 2023

(65) Prior Publication Data
US 2025/0146579 A1 May 8, 2025

(51) Int. Cl.
F16K 1/22 (2006.01)
F16K 47/02 (2006.01)
F16K 47/04 (2006.01)

(52) U.S. Cl.
CPC .............. F16K 1/222 (2013.01); F16K 47/02 (2013.01); F16K 47/045 (2013.01); F16K 47/04 (2013.01)

(58) Field of Classification Search
CPC ........ F16K 1/222; F16K 47/045; F16K 47/04; F16K 47/02

(Continued)

(56) References Cited

U.S. PATENT DOCUMENTS 3,960,177 A * 6/1976 Baumann ................ F16K 1/222
251/305
4,770,393 A * 9/1988 Hubertson ............ F16K 1/2263
251/305
(Continued)

FOREIGN PATENT DOCUMENTS

DE 102012102472 A1 9/2013
JP 2003-254450 A 9/2003
(Continued)

OTHER PUBLICATIONS

Sep. 26, 2025 Extended European Search Report issued in European Patent Application No. 21968769.6.

(Continued)

*Primary Examiner* — John Bastianelli
(74) *Attorney, Agent, or Firm* — Oliff PLC

(57) ABSTRACT

An eccentric butterfly valve having a closure member, a sealing surface extending along an outer periphery of closure member to form a sealing plane, a drive shaft having a center axis and a first end protruding out of the valve, a first opening and second opening, and closure member engages a second end of the drive shaft. The closure member is rotatably arranged in the valve to be moved by rotation around the center axis of the drive shaft between a fully closed position and a fully open position. Furthermore, the closure member has a first face facing towards the first opening of the valve in the fully closed position and a second face facing towards the second opening of the valve in the fully closed position. The closure member is provided with a balancing disk extending from the first face and being perforated by a plurality of through holes.

9 Claims, 3 Drawing Sheets

(58) Field of Classification Search
USPC .......................................... 251/305–308, 208
See application file for complete search history.

(56) References Cited

U.S. PATENT DOCUMENTS

| | | | | |
|---|---|---|---|---|
| 5,465,756 | A * | 11/1995 | Royalty | F16K 1/222 |
| | | | | 251/305 |
| 6,702,257 | B1 * | 3/2004 | Mollmann | F16L 55/10 |
| | | | | 251/305 |
| 6,726,176 | B2 * | 4/2004 | Bauman | F16K 1/222 |
| | | | | 251/305 |
| 6,758,458 | B2 * | 7/2004 | Ando | F16K 1/2265 |
| | | | | 251/305 |
| 7,815,163 | B2 * | 10/2010 | Siame | F16K 1/222 |
| | | | | 251/305 |
| 8,161,996 | B2 * | 4/2012 | Barker | F16K 1/22 |
| | | | | 251/306 |
| 10,746,322 | B2 * | 8/2020 | Fages | F16K 47/04 |

| | | | | |
|---|---|---|---|---|
| 2013/0248748 | A1 * | 9/2013 | Baumann | F16K 1/2014 |
| | | | | 251/305 |
| 2015/0345661 | A1 | 12/2015 | Herold | |
| 2022/0145994 | A1 * | 5/2022 | Muneyoshi | F16K 1/2014 |

FOREIGN PATENT DOCUMENTS

| | | |
|---|---|---|
| JP | 2003-0329169 A | 11/2003 |
| JP | 2013-083285 A | 5/2013 |
| KR | 20190065891 A | 6/2019 |
| WO | 2013/084607 A1 | 6/2013 |

OTHER PUBLICATIONS

Sep. 5, 2022 International Search Report issued in International Patent Application No. PCT/FI2021/050910.
Sep. 5, 2022 Written Opinion issued in International Patent Application No. PCT/FI2021/050910.

* cited by examiner

VALVE AND METHOD FOR MANUFACTURING A CLOSURE MEMBER

BACKGROUND OF THE INVENTION

Field of the Invention

This invention relates to a valve with a closure member.

Description of Prior Art

In relation to numerous fluid-conveying piping systems, such as liquid or gas conveying systems, it is known to use different types of valves for controlling the flow of the fluid through said piping systems. One commonly used type of said valves is a butterfly valve. Butterfly valves can be concentric or eccentric designs, wherein eccentricity refers to the offset of the valve shaft rotation axis. For example, the valve can be a double eccentric valve, in which the shaft axis is offset from the seat of the valve closure member and the centerline of the valve body seal ($1^{st}$ offset), and the shaft axis is eccentric to the centerline of the valve/pipeline ($2^{nd}$ offset).

A known problem of said eccentric butterfly valves is the dynamic torque associated with the operation of such valves, which is caused by the force applied by the flowing fluid to the valve closure member. Due to dynamic torque, significant force is often required to operate said valves, especially in industrial applications where relatively powerful actuating power sources, such as pneumatic actuators, are therefore needed for valve operation. The level of said dynamic torque is also typically not constant over the whole range of motion of the valve closure member. This, in turn, requires the actuating power source to be scaled according to the peak torque value, and causes the valve system to go through stress cycles of relatively high amplitude during each closure member rotation. The varying level of dynamic torque may also deteriorate the control performance of a butterfly valve assembly.

SUMMARY OF THE INVENTION

An object of the present invention is to solve the above-mentioned drawbacks and to provide a solution for reduced dynamic torque with minimized reduction of valve maximum capacity. This object is achieved with a valve and a method.

By providing the valve with a closure member that is provided with a balancing disk perforated by a plurality of through holes and formed as an integral part of the closure member, it is possible to obtain a structure that minimizes dynamic torque.

Preferred embodiments of the invention are disclosed in the dependent claims.

BRIEF DESCRIPTION OF DRAWINGS

In the following the present invention will be described in closer detail by way of example and with reference to the attached drawings, in which.

DESCRIPTION OF AT LEAST ONE EMBODIMENT

Figures 1, 2, 3:
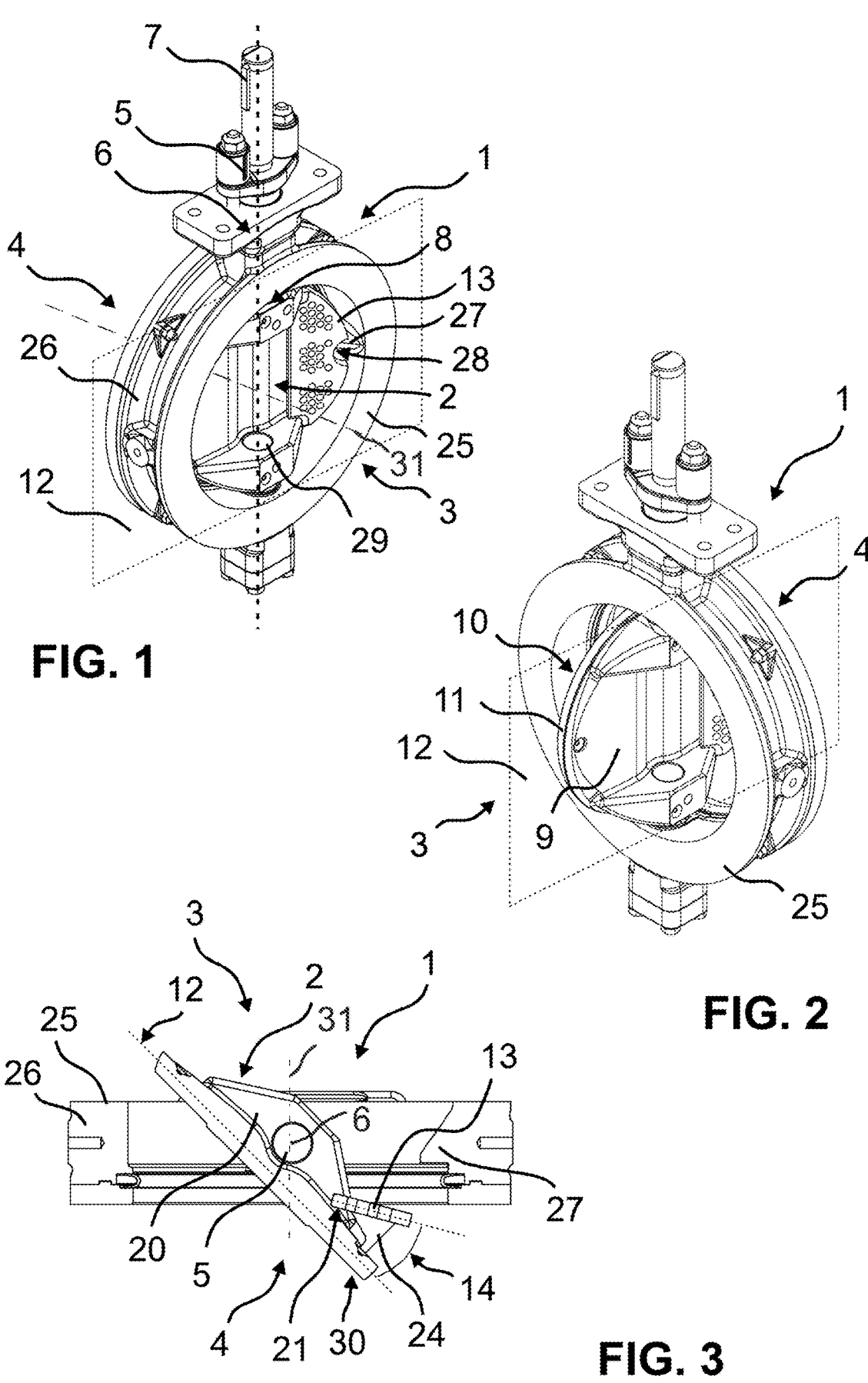
FIG. 1 illustrates a first embodiment of a valve and a closure member in a fully closed position.
FIG. 2 illustrates a valve and a closure member of FIG. 1 in a fully open position.
FIG. 3 illustrates a cross-cut view of a valve and a closure member of FIGS. 1 and 2 in a partially open position.

FIG. 1 illustrates a first embodiment of a valve 1 with a closure member 2, as seen from a shaft side in a diagonal angle. In this example, the valve 1 is an eccentric wafer-type butterfly valve, but in other embodiments of the invention, it can also be, for example, a lug-type valve. The term "eccentric" valve refers to a valve where the center axis 6 around which the closure member 2 rotates is offset by a distance (varying from case to case) from a center line 31 of a flow channel through the valve, and/or where the center axis 6 is offset by a distance (varying from case to case) from a plane defined by a seal section on the valve body, which seal section together with the closure member makes the valve fluid tight in the fully closed position.

In FIG. 1, the closure member 2 is in a fully closed position, such that it prevents flow through the valve 1. That is, the valve 1 comprises a sealing surface 11 extending along an outer periphery of the closure member 2 to form a sealing plane 12, wherein passing of the flow past said sealing plane 12 is prevented in the fully closed position of the closure member 2. In this example, the valve 1 also has a first opening 3, a second opening 4 and a drive shaft 5 having a center axis 6, wherein the first opening 3 is located on the same side of the sealing plane 12 as the drive shaft 5. The drive shaft 5 has a first end 7 protruding out of the valve 1, and the closure member 2 engages a second end 8 of the drive shaft 5 so that it is rotatably arranged in the valve 1 to be moved by rotation around the center axis 6 of the drive shaft 5.

In praxis the valve may be provided with a one-part shaft or with a two-part shaft. In the illustrated example, the valve 1 is provided with a two-part shaft, which includes the drive shaft 5 and the trunnion 29, which both have a common center axis 6. The drive shaft 5 has a first end 7 protruding out of the valve 1 such that it can be engaged by an actuator which causes the drive shaft to rotate. A second end 8 of the drive shaft 5 engages the closure member 2, such that the closure member 2 rotates with the drive shaft 5 around the center axis 6. The trunnion 29 is in FIGS. 1 and 2 located in the lower part of the valve 1, where it engages the closure member 2. The lowermost part of the trunnion is rotatably engaged with a body of the valve 1, by a bearing, for instance.

As an alternative, in case a one-part shaft would be utilized in the illustrated valve 1, the drive shaft 5 would extend through the entire valve 1 such, that the upper first end 7 can be engaged by an actuator, and the lower second part is rotatably engaged with the body of the valve 1, by a bearing for instance. In that case the closure member 2 is engaged to a middle section of the drive shaft 5.

FIG. 2 illustrates the valve 1 and the closure member 2 of FIG. 1 in the fully open position, as seen from a shaft side in a diagonal angle. In the example of FIGS. 1 and 2, the closure member 2 has a first face 9 facing towards the first opening 3 of the valve 1 in the fully closed position, a second face 10 facing towards the second opening 4 of the valve 1 in the fully closed position, and the sealing surface 11 extends along the outer periphery of the closure member 2 between said first face 9 and second face 10 to form the sealing plane 12. In other words, the sealing surface 11 forms a continuous loop extending on a plane along the outer periphery of the closure member 2, said plane being the sealing plane 12. In the fully closed position, the sealing surface 11 contacts a mating surface on the valve body 26 to prevent fluid from passing through the valve 1.

FIG. 3 illustrates a cross-cut view of the valve 1 and the closure member 2 of FIGS. 1 and 2 in a partially open position, as seen from above, in other words from the direction of the first end 7 of the drive shaft 5. As seen from FIG. 3, in this example the closure member 2 is provided with a balancing disk 13 extending from the first face 9 (shaft side) in a direction away from the sealing plane 12 and the drive shaft 5 to form an angle 14 with the sealing plane 12 which is less than 90°. In the example of FIGS. 1 to 3, said angle 14 is arranged to be approximately 35°, but can deviate from this value in other embodiments of the invention.

In case the first opening 3 is an inlet and the second opening 4 is an outlet, for instance, the fluid flow passing the closure member 2 from the first opening 3 to the second opening 4 is brought into contact with the closure member 2 and the balancing disk 13, due to which the fluid pressure creates a force attempting to turn a leading edge side 30 of the closure member 2 with the balancing disk 13 from the fully closed position towards the second opening 4. In other words, this force is a balancing force turning the closure member 2 toward an open position. By altering the angle 14 and the hole area of the balancing disk 13, for instance, the magnitude of this force can be adjusted. Due to this force, a dynamic torque is obtained which affects the torque needed to rotate the drive shaft 5 and the closure member 2 at different opening angles of the closure member 2. For the purpose of favorably affecting the torque needed to rotate the closure member 2, it has been found suitable to arrange the angle 14 in a range of 30° to 60°.

Figure 4:
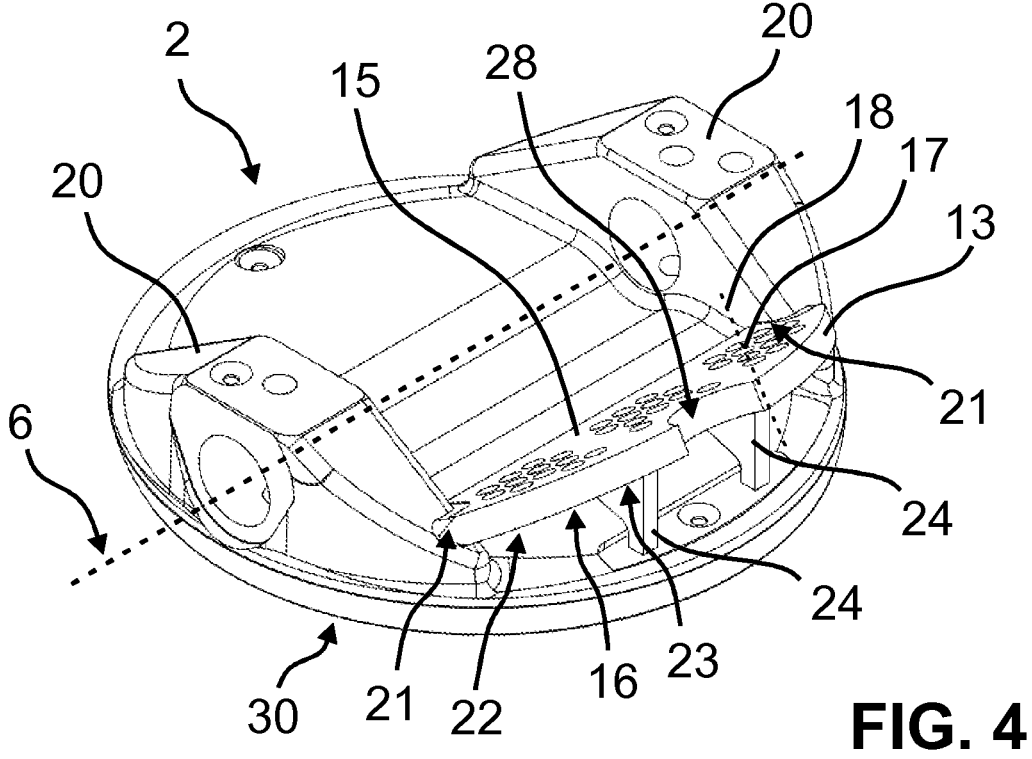
FIG. 4 illustrates a closure member of FIGS. 1 to 3.

FIG. 4 illustrates the closure member 2 of FIGS. 1 to 3 isolated from the valve 1, as seen from the side of the first face 9. As seen from FIG. 4, the balancing disk 13 has a first surface 15 facing the first opening 3 in the fully closed position and defining a first area, and a second surface 16 facing the second opening 4 in the fully closed position, and the balancing disk 13 is perforated by a plurality of through holes 17. In the illustrated example, the plurality of through holes 17 extend between said first surface 15 and second surface 16 so that the plurality of through holes 17 constitute approximately 20% of the first area. This value, however, can deviate from said example in other embodiments of the invention, and has been found to be favorably in the perforation range of approximately 15% to 25% of the first area. With said arrangement, a portion of the fluid flow passing the closure member 2 is passed through the plurality of through holes 17, providing improvements in, for example, anti-cavitation or noise reduction performance of the closure member 2, as well as maximum flow capacity.

Furthermore, as seen from FIG. 4, the through holes 17 in this example have a cylindrical shape and a center axis 18 which is substantially perpendicularly orientated in relation to the first surface 15 of the balancing disk 13. The shape and orientation of the through holes 17 in relation to the first surface 15 can, however, also deviate from said example in other embodiments of the invention. It is also not required that all through holes 17 of the plurality of through holes have the same shape, size and orientation, and the preferred combination of said properties can be chosen based on, for example, the requirements set by the target application of the valve 1. The distance between the first surface 15 and the second surface 16, and thereby the extent of the through holes 17 can also be adjusted based on, for example, the required mechanical strength of the balancing disk 13 and its desired influence on the fluid flow passing the closure member 2. In the preferred embodiment, however, said distance is at least 4 mm in the middle section of the balancing disk 13, such as in the perforated part of the balancing disk 13, or in parts of the balancing disk which are not located in the vicinity of its outer perimeter. This ensures sufficient mechanical strength and stiffness of the balancing disk 13. When adjusting said properties of the balancing disk 13 and the plurality of through holes 17, different optimization tools, such as computational simulations, can be used.

Figure 5:
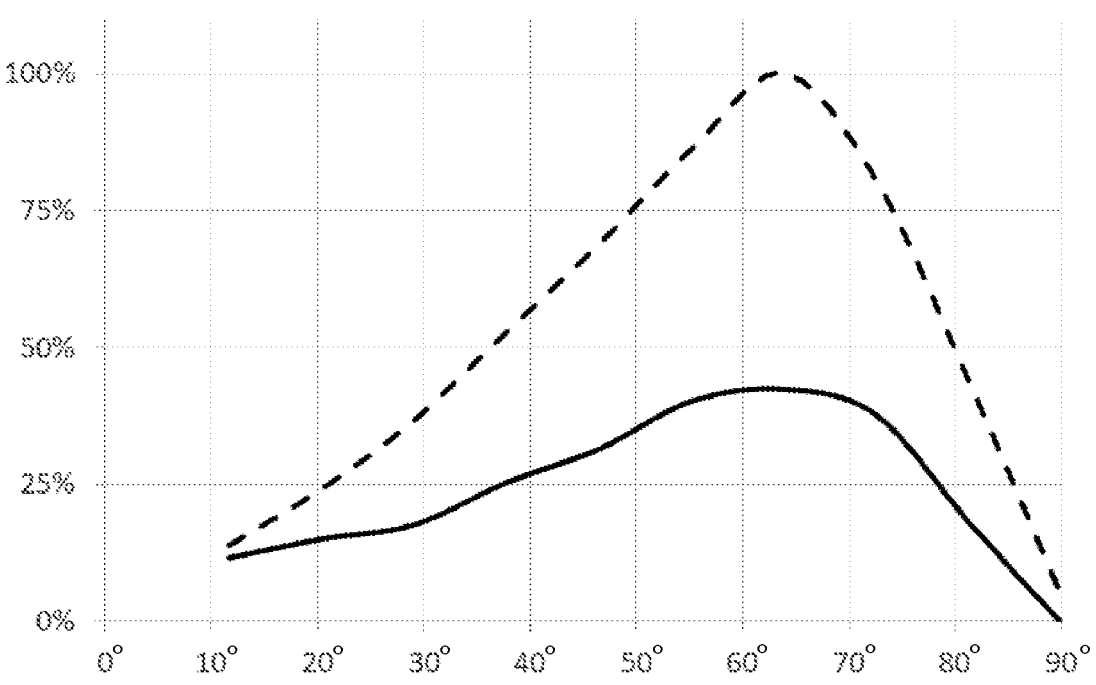
FIG. 5 illustrates a torque needed for controlling the valve of FIGS. 1 to 3.

FIG. 5 illustrates the torque (relative dynamic torque indicated as percentage) needed for controlling the valve of FIGS. 1 to 3 over a range of closure member 2 opening angles. Said torque is illustrated in the figure with a continuous line. Additionally, for comparison to a prior art solution, also the torque needed for controlling a valve that is identical to the valve of FIGS. 1 to 3 apart from not including the balancing disk 13 is illustrated in the figure. This torque is illustrated in FIG. 5 with a dashed line. In both said example cases, the highest torque values are reached at opening angles of around 60°-70°, wherein the most significant difference between said example cases, in other words the most significant reduction of the torque values obtained with the balancing disk 13, is also reached at said opening angles. Consequently, a significant reduction in the torque needed by an actuator to turn the closure member in the valve can be achieved in the range of 50° to 80° with the valve illustrated in FIGS. 1 to 3.

Figure 6:
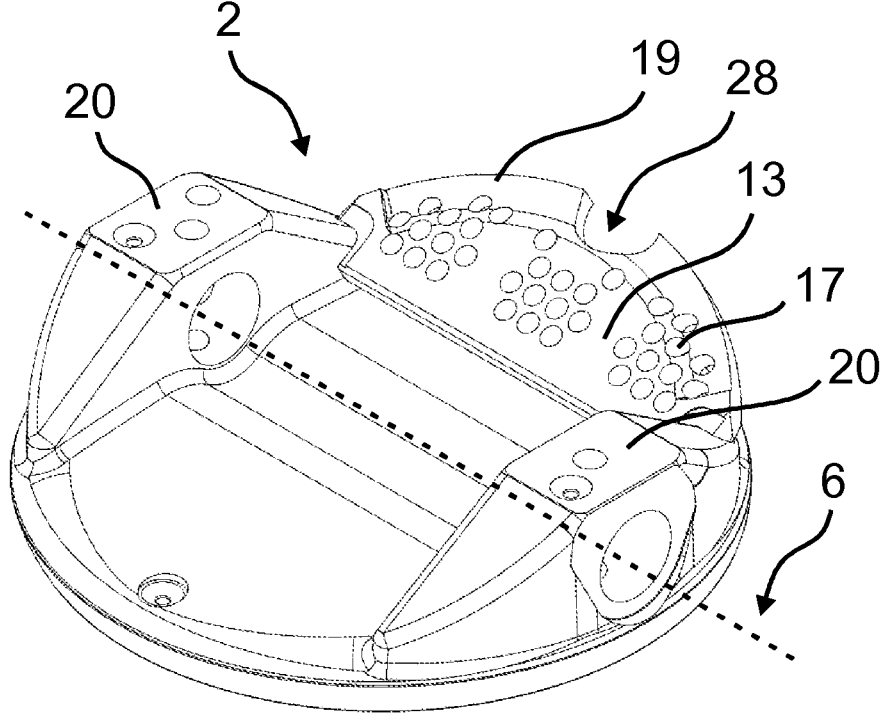
FIG. 6 illustrates a second embodiment of a closure member.

FIG. 6 illustrates a second embodiment of the closure member 2, in which the balancing disk 13 further comprises a flow characterizing edge 19 located on the first surface 15 along the outer perimeter of the balancing disk 13. In this example, the flow characterizing edge 19 forms a flow characterizing formation on the first surface 15, consequently altering the fluid flow behavior in the vicinity of said outer perimeter of the balancing disk 13.

In this connection the term "flow characterizing edge" should be understood to include at least solutions where:

the thickness of the balancing disk 13 decreases when moving from a center part of the balancing disc towards the perimeter. In other words, the thickness of the balancing disk does not at any stage increase when moving towards the outer perimeter in the flow characterizing edge part, though at some locations of the flow characterizing edge part the thickness may remain constant while moving further towards the outer perimeter.

the thickness of the balancing disk initially decreases when moving from a center part of the balancing disc towards the perimeter, but before reaching the outer perimeter, the thickness starts to increase. In that case at the perimeter the thickness may be larger or smaller than at the center part of the balancing this.

the thickness of the balancing disk increases when moving from a center part of the of the balancing disc towards the perimeter. In other words, the thickness of the balancing disk does not at any stage decrease when moving towards the outer perimeter in the flow characterizing edge part, though at some locations of the flow characterizing edge part the thickness may remain constant while moving further towards the outer perimeter.

Different optimization tools, such as computational simulations, can be used for adjusting the form of the flow characterizing edge 19 according to the target application.

As a consequence of the balancing disk 13 being provided on the closure member 2 according to the examples of FIGS. 1 to 4 and FIG. 6, the contact angle between the fluid flow passing the closure member 2 and the balancing disk 13 is continuously altered as the closure member 2 is moved between the fully closed position and the fully open position. Consequently, the influence of the balancing disk 13 on the dynamic torque varies over the range of motion of the closure member 2 in the illustrated examples, as is clear from FIG. 5, for instance.

Furthermore, as a consequence of the balancing disk 13 being provided on the closure member 2 according to the examples of FIGS. 1 to 4 and FIG. 6, the reduction of the flow cross-section area of the valve 1 caused by the balancing disk 13, and consequently the negative influence of the balancing disk 13 on the maximum capacity of the valve 1, is minimized. In other words, in the orientation area of the closure member 2 near the fully open position, in which said flow cross-section area reaches its greatest value, the influence of the balancing disk 13 on the flow cross-section area is nearing its minimum. By contrast, in solutions in which additional structures for influencing the fluid flow are provided on the valve body, the maximum capacity of the valve is reduced by the full surface area of said additional structures in the direction of the fluid flow.

As seen in FIGS. 1 to 4 and FIG. 6, in the illustrated examples the balancing disk 13 extends from the first face 9 (shaft side) at a location of the closure member 2 which moves towards the second opening 4 when the closure member 2 is moved from the fully closed position towards the fully open position, in other words the leading edge side 30 of the closure member 2. In said examples, the balancing disk 13 is formed as an integral part of the closure member 2, in other words so that detachable attachment fittings, such as screws or bolts, are not used for attaching said parts. This can be achieved, for example, by a manufacturing method where initially a closure member 2 comprising a first face 9, a second face 10 and a gap or gaps 21 on the first face 9 is taken into use. Such a closure member may be manufactured by casting, for instance, in which case the gaps 21 may be produced during casting or alternatively, after casting by machining.

In a second step of the manufacturing method, the balancing disk 13 is arranged to protrude into the gap or gaps 21. Finally, the balancing disk 13 may be attached by welding or soldering to the closure member 2, such that the balancing disk 2 becomes an integral and non-detachable part of the closure member 2. This ensures that the balancing disk 13 is so firmly attached, that it cannot even during extreme pressure conditions detach from the closure member 2 to move with the fluid flow. Alternatively, the balancing disk 13 can be formed together with the closure member 2 as a unibody structure through, for example, casting or additive manufacturing.

By said arrangements, the contact interface between the balancing disk 13 and the closure member 2 can be formed without discontinuities, such as protruding attachment fitting, and thereby to cause minimized disturbance to the fluid flow passing the closure member 2. This, in turn, has a reducing influence on the amount of, for example, cavitation and noise induced by said fluid flow on the valve 1 and the closure member 2.

Furthermore, as seen in FIGS. 1 to 4 and FIG. 6, the closure member 2 in these examples comprises two hubs 20, in other words shaft supports, engaging the drive shaft 5 and the trunnion 29, and the balancing disk 13 connects to said hubs 20. More precisely, the hubs 20 in said examples are provided with the gap 21 into which the balancing disk 13 protrudes. However, the number of the hubs 20, said hubs 20 being formed as, for example, drive shaft supports, can deviate from said examples in other embodiments of the invention, said number being at least one. The presented arrangement allows the balancing disk 13 to be firmly integrated into the closure member 2, by simultaneously avoiding any unfavorable discontinuities, such as gaps, from being formed between the balancing disk 13 and the hubs 20 in the direction of the fluid flow. The gaps 21 into which the balancing disk 13 protrudes provide a robust point of attachment for the balancing disk 13, as the walls of the gaps 21 provide additional support to the balancing disk 13 against external forces even in the case of, for example, damaging of the welded attachment of the balancing disk 13. Additionally, providing the gap 21 to the at least one hub 20 according to said examples further improves the dimensional compatibility between the closure member 2 and the balancing disk 13 for further improved integration of said parts and easier assembly.

As seen in FIGS. 1 to 4 and FIG. 6, in the illustrated examples the balancing disk 13 comprises a proximate section 22 and a distal section 23, said proximate section 22 being located closer to the sealing plane 12 than the distal section 23. Furthermore, the balancing disk 13 also comprises at least one leg 24, said at least one leg 24 connecting at least the distal section 23 of the balancing disk 13 to the first face 9 of the closure member 2. With said arrangement, the mechanical strength and dimensional stability of the balancing disk 13 can be further increased.

As seen in FIGS. 1 to 3, in the illustrated example the valve 1 comprises a first surface 25 defining an outer perimeter of the valve 1 on the side of the first opening 3, and the balancing disk 13 does not extend past the first surface 25 in the fully closed position of the closure member 2. In other words, the balancing disk 13 is oriented and dimensioned so that it extends from the first face 9 no further than to the first surface 25 in the fully closed position of the closure member 2. Said arrangement enables the valve 1 to be installed and removed from its installation site, such as a connection point of a piping system, without a need to adjust, remove or detach any structural part of the piping system other than the valve 1 or the valve attachment fittings.

The balancing disk 13 according to FIGS. 1 to 4 and FIG. 6 has been arranged so that it does not extend past the imaginary spherical surface defined by the sealing surface 11 of the closure member 2 as the closure member 2 is rotated around the center axis 6, to enable the closure member 2 to be moved between the fully closed position and the fully open position without contacting a valve body 26 surrounding the closure member 2.

As seen in FIGS. 1 and 3, in the illustrated example the valve body 26 surrounding the closure member 2 comprises a protrusion 27 preventing the closure member 2 from moving past the fully closed position. Additionally, as seen in FIGS. 4 and 6, the balancing disk 13 further comprises a slot 28 extending through the volume of the balancing disk 13 at an outer perimeter of the balancing disk 13 at the location of the protrusion 27 to allow said protrusion 27 to pass through said slot 28 when the closure member 13 is moved between the fully closed position and the fully open position. In other words, the protrusion 27 and the slot 28 have been formed to be compatible with each other such that the cross-cut section of the slot 28 in the direction of the sealing plane 12 extends further along the sealing plane 12 than the cross-cut section of the protrusion 27 in said direction. Said arrangement enables the protrusion 27 to be used as a safety limit to the closure member 2 rotation while enabling the balancing disk 13 to extend close to the valve body 26 surrounding the closure member 2 in the areas of the outer perimeter of the balancing disk 13 surrounding the slot 28.

It is to be understood that the above description and the accompanying figures are only intended to illustrate the present invention. It will be obvious to a person skilled in the art that the invention can be varied and modified without departing from the scope of the invention.

The invention claimed is:

1. An eccentric butterfly valve comprising:
a closure member;
a valve body surrounding the closing member;
a balancing disk;
a sealing surface extending along an outer periphery of the closure member to form a sealing plane;
a drive shaft having a center axis and a first end protruding out of the eccentric butterfly valve; and
a first opening and a second opening, the first opening being located on the same side of the sealing plane as the drive shaft when the closure member is in a fully closed position, in which the sealing surface contacts a mating surface on the valve body, wherein:
the closure member engages the drive shaft and is rotatably arranged in the eccentric butterfly valve to be moved by rotation around the center axis of the drive shaft between the fully closed position, in which the closure member prevents flow through the eccentric butterfly valve, and a fully open position, in which the closure member does not prevent flow through the eccentric butterfly valve;
the closure member has a first face facing towards the first opening in the fully closed position, a second face facing towards the second opening in the fully closed position;
the center axis is offset by a distance from a center line of a flow channel through the eccentric butterfly valve;
the closure member is provided with a balancing disk extending from the first face in a direction away from the sealing plane to form an angle with the sealing plane which is 30° to 60°;
the balancing disk is perforated by a plurality of through holes;
the balancing disk is formed as an integral part of the closure member;
the first opening is an inlet and the second opening is an outlet; and
the balancing disk extends from the first face at a leading edge side of the closure member which moves towards the second opening when the closure member is moved from the fully closed position towards the fully open position.

2. The eccentric butterfly valve according to claim 1, wherein:
the closure member includes at least one hub engaging the drive shaft; and
the balancing disk connects to the at least one hub.

3. The eccentric butterfly valve according to claim 2, wherein the at least one hub includes a gap into which the balancing disk protrudes.

4. The eccentric butterfly valve according to claim 1, wherein:
the balancing disk comprises a proximate section and a distal section;
the proximate section is located closer to the sealing plane than the distal section; and
the balancing disk further includes at least one leg, the at least one leg connecting at least the distal section of the balancing disk to the first face of the closure member.

5. The eccentric butterfly valve according to claim 1, wherein:
the eccentric butterfly valve includes a first surface defines an outer perimeter of the eccentric butterfly valve on a side of the first opening; and
the balancing disk does not extend past the first surface in the fully closed position.

6. The eccentric butterfly valve according to claim 1, wherein:
the balancing disk has a first surface facing the first opening in the fully closed position and defines a first area and a second surface facing the second opening in the fully closed position; and
the plurality of through holes extend between said first surface and second surface so that the plurality of through holes constitute 15% to 25% of the first area.

7. The eccentric butterfly valve according to claim 6, wherein at least one through hole of the plurality of through holes has a cylindrical shape and has a center axis which is substantially perpendicularly orientated in relation to the first surface.

8. The eccentric butterfly valve according to claim 1, wherein:
the valve body surrounding the closure member includes a protrusion preventing the closure member from moving past the fully closed position; and
the balancing disk further includes a slot extending through a volume of the balancing disk at an outer perimeter of the balancing disk at a location of the protrusion to allow said protrusion to pass through said slot when the closure member is moved between the fully closed position and the fully open position.

9. The eccentric butterfly valve according to claim 1, wherein the balancing disk further includes a flow characterizing edge located on a first surface along an outer perimeter of the balancing disk.

* * * * *